June 12, 1956  W. R. MERCER ET AL  2,750,565
ALTIMETER MODULATORS

Filed Sept. 13, 1952  3 Sheets-Sheet 1

INVENTORS
WILLIAM R. MERCER
FLOYD T. WIMBERLY
LLOYD E. ST. JEAN
BY Elmer J. Gorn
ATTORNEY

INVENTORS
WILLIAM R. MERCER
FLOYD T. WIMBERLY
LLOYD E. ST. JEAN
BY
ATTORNEY

United States Patent Office 2,750,565
Patented June 12, 1956

2,750,565

ALTIMETER MODULATORS

William R. Mercer, Belmont, Floyd T. Wimberly, Watertown, and Lloyd E. St. Jean, Arlington, Mass., assignors to Raytheon Manufacturing Company, Newton, Mass., a corporation of Delaware Application September 13, 1952, Serial No. 309,444

7 Claims. (Cl. 332—5)

This invention relates to a stable frequency modulated altimeter circuit utilizing degenerative feedback and, more particularly, relates to a degenerative velocity feedback system for stabilizing the frequency modulation characteristics of a modulator of the vibrating reed magnetron type.

An object of this invention is to provide a frequency modulation circuit for an electron discharge device of the tunable magnetron type capable of producing a substantially stable frequency modulated output.

Another object of this invention is to provide a degenerative feedback circuit for a frequency modulated magnetron of the vibrating reed type for improving the stability and wave form of the frequency modulated output derived therefrom.

Another object of this invention is to provide means for reducing the effect of temperature changes on the parameters of a frequency modulated magnetron of the vibrating reed type.

Still another object of this invention is to provide means for eliminating undesirable resonance effects in a frequency modulated magnetron of the vibrating reed type.

A further object of this invention is to provide means for achieving a higher degree of frequency modulation stability in a precision frequency modulated radio altimeter.

A still further object of this invention is to provide an accurate frequency modulated altimeter using a tunable magnetron of the vibrating reed type which is substantially unaffected by changes in the frequency modulating rate.

Other and further objects and advantages of this invention will be apparent as the description thereof progresses, reference being had to the accompanying drawings wherein.

Figure 1:
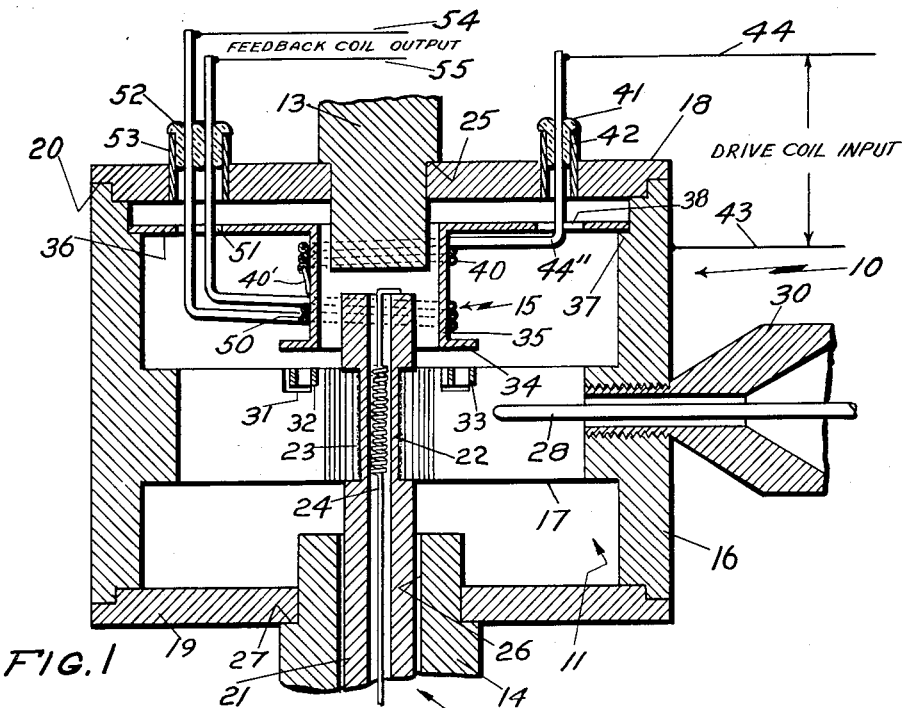
Fig. 1 is a fragmentary longitudinal sectional view taken through the center of a magnetron of the vibrating reed type showing driving and feedback coils on the reed.

In frequency modulated altimeters a varying transmission frequency is continuously compared with the received frequency to obtain a low frequency difference signal proportional to the delay time over the transmission path. Since the transmission path is equal to twice the altitude, the delay time and thus the difference frequency are proportional to altitude. The instantaneous difference frequency is equal to the instantaneous rate of change of transmitter frequency times twice the altitude divided by the velocity of propagation. For ease in instrumentation and for maximum signal to noise ratio at high altitude, it is desirable to maintain a constant difference frequency during the time required for measurement. Theoretically, this requires a linearly changing frequency varying from zero to infinity. Practically, this requirement is met by a relatively small periodic triangular variation of the transmitter frequency with minimum turn around time at the ends of each half sweep cycle.

The basic equation for an altimeter using triangular wave form frequency modulation is given by:

$$f_h = \frac{f_m(F_2 - F_1)h}{246} \qquad (1)$$

where:

$f_h$ is the audio frequency difference between instantaneous received and transmitted frequencies in C. P. S., $f_m$ is the low frequency triangular modulation rate in C. P. S., $F_1 - F_2$ is the peak-to-peak frequency deviation in megacycles per second, and $h$ is the altitude in feet.

In altimeters using a magnetron as a transmitter, the transmitter frequency is determined by the magnetron cavity resonance. This resonance is partially determined by the impedance of the cavity strapping. A tuning disk mounted on a metallic reed external to and adjacent the straps controls the capacitive reactance of these straps over a limited range. Thus frequency modulation of the magnetron is achieved by variation of the reed position relative to the anode structure of the magnetron, as will be pointed out in greater detail subsequently.

Motion of the reed is obtained by the conventional speaker voice coil arrangement mounted near the tuning disk on the flange-supported reed.

The equation of motion of the reed drive system above mentioned when driven directly by the source of voltage may be approximated as:

$$M\frac{d^2x}{dt^2} + B\frac{dx}{dt} + Kx = Ui \qquad (2)$$

where:

$x$ is the deflection of the reed from a neutral position,
M is the mass of the reed,
B is the frictional damping,
K is the spring stiffness,
$i$ is the current in drive coil, and
U is the electromechanical coupling coefficient or force per unit current (equal to the products of the length $l$ of the wire in the drive coil and the magnetic field intensity).

The equation relating voltage and current in the electrical circuit is:

$$L\frac{di}{dt} + Ri = e_0(t) - U\frac{dx}{dt} \qquad (3)$$

where:

L is the inductance of the drive coil,
R is the resistance of the coil,
$i$ is the current in the coil,
$e_0(t)$ is the applied voltage function, and
U is the electromechanical coupling coefficient.

For the particular application of the subject invention, the rates of change and frequencies of interest are relatively low so that the inductance does not limit the current flow. Since the $$L\frac{di}{dt}$$

term of Equation 3 is substantially zero, the current $i$ from Equation 3 may be given as:

$$i = \frac{e_0(t) - U\frac{dx}{dt}}{R} \quad (4)$$

In operational form where $$s = \frac{d}{dt}$$

the current $i$ is given by:

$$I(s) = \frac{E_0(s) - UsX(s)}{R} \quad (5)$$

The mechanical Equation 2 may likewise be written in operational form as:

$$Ms^2X(s) + BsX(s) + KX(s) = UI(s) \quad (6)$$

Substituting for $I(s)$ the equivalent from Equation 5:

$$X(s)[Ms^2 + Bs + K] = U\left[\frac{E_0(s) - UsX(s)}{R}\right] \quad (7)$$

Rearranging terms in Equation 7:

$$X(s)\left[Ms^2 + \left(B + \frac{U^2}{R}\right)s + K\right] = \frac{UE_0(s)}{R} \quad (8)$$

From which $$Xs = \frac{U}{RK}E_0(s)\frac{1}{\frac{M}{K}s^2 + \left(\frac{B}{K} + \frac{U^2}{RK}\right)s + 1} \quad (9)$$

Equation 8 shows that the steady state (i. e., $s=0$) D. C. or low frequency deflection amplitude is determined by the applied voltage $E_0$, the magnetic field strength, the resistance of the drive coil, and the spring stiffness of the mechanical reed.

Substituting $j\omega$ for $s$ in Equation 9, the deflection vs. frequency response is given by:

$$X(j\omega) = \frac{U}{RK}E_0(j\omega)\frac{1}{\frac{M}{K}(j\omega)^2 + \left(\frac{B}{K} + \frac{U^2}{RK}\right)j\omega + 1} \quad (10)$$

When the first and other terms of the quadratic factor $$\frac{M}{K}(j\omega)^2 + \left(\frac{B}{K} + \frac{U^2}{RK}\right)j\omega + 1$$

of Equation 10 are equal, a condition of resonance is obtained. In other words, at resonance $$\frac{M}{K}(j\omega)^2 = -1 \quad (11)$$

or $$\omega = \sqrt{\frac{K}{M}} \quad (12)$$

from which the resonant frequency $f_r$ is $$f_r = \frac{1}{2\pi}\sqrt{\frac{K}{M}} \quad (13)$$

For a typical magnetron used with this invention, $f_r$ is equal to approximately 300 cycles per second.

The capacity between the reed tuning disk and the magnetron anode straps is a function of the displacement $X(s)$ of the reed from its neutral position. For small deflections, that is, small changes of capacitance, the magnetron frequency is a linear function of reed position. The peak FM deviation, therefore, for periodic motion of the reed, is linearly related to the peak displacement of the reed.

When a magnetron of the vibrating reed type is used in an open loop system, several difficulties arise. The temperature stabilization of the reed may take as long as thirty minutes, during which time the reed resistance may vary from twenty-five per cent. to fifty per cent. The reed compliance will also vary with temperature. Since the amplitude of the deflection is proportional to R and K, Equation 9, and amplitude of deflection is proportional to $(F_2-F_1)$, Equation 1, a corresponding inaccuracy will result in indicated altitudes using readily attainable driving sources. Moreover, the power dissipated as heat in the anode circuit of the magnetron has been found to produce a 0.5% change in the indicated altitude per milliampere change of anode current.

The function of the modulator is to drive the FM reed in the magnetron in such a manner that symmetrical triangular frequency modulation of the magnetron output frequency is attained. To do this, the FM reed must be made to move at a constant velocity in one direction, to reverse rapidly and to move at a constant velocity in the opposite direction; that is, the variation of the diaphragm displacement with time is triangular. Over the range of frequencies of concern the inductance of the reed drive coil is very small compared with the coil resistance. For low frequencies, therefore, current in the drive coil and the voltage applied thereto must be substantially in phase.

If the reed had no mass, a triangular current wave form flowing through the driving coil would interact with the magnetron leakage field to produce the desired triangular motion of the reed and a drive voltage of triangular wave form would cause the reed to move in the desired manner. Since the reed used, of necessity, has mass, it also has resonance effects. If a driving voltage of triangular wave form were used, the reed mass would cause rounding at the turn around points because of the inertia of the moving reed. This could be corrected by adding a notch in the driving voltage at the turn around point. However, driving circuits of the reed for attaining the notched triangular wave form necessary to achieve triangular motion with minimum turn around are unduly complex and, furthermore, the higher frequency components of a notch which is sharp enough to reduce the rounding to within acceptable limits will also excite the primary and secondary frequency resonances in the reed structure, causing it to ring. (A typical reed used is resonant at approximately 300 cycles per second with a secondary resonance at approximately 5,000 cycles per second.) Because of the high Q of the resonant reed, considerable microphonic modulation will occur at the resonant frequency.

With prior art systems, another problem is that of attaining high reed sensitivity simultaneously with adequate band width requisite for a good triangular wave form. In order to excite a reed of a given mass with a reasonably small driving power, the reed should have a low mechanical resonant frequency. With a low mechanical resonant frequency, however, strong low order harmonics of the reed drive frequency (approximately 100 C. P. S.) will excite the reed into resonance, thereby causing an undesirable sinusoidal movement of the reed which is inconsistent with triangular frequency modulation. By increasing the natural resonant frequency of the reed, the drive frequency and its harmonics have insufficient amplitude to incite the reed to mechanical resonance. A high frequency resonance is required so that an adequate low frequency response is available to permit minimum turn around time. The resonant frequency of the reed can be varied only by changing the spring stiffness K, since the mass M is restricted by the available space. Unfortunately, increasing the spring stiffness directly affects the deflection sensitivity. It has been found in an open loop system that, when the primary resonance is raised to a suitable frequency to obtain a good triangular wave form, a prohibitive amount of power is required to drive the reed.

To overcome the above-mentioned defects, and pursuant to the invention, a degenerative closed loop feedback amplifier system is employed to drive the vibrating reed in the magnetron. The inverse feedback is obtained by a feedback coil wound in proximity with the reed drive coil.

It is well known that a conductor moving in a magnetic field will generate a voltage proportional to its length, the magnetic field intensity and the velocity of motion of the conductor. This motional voltage produced in the feedback coil due to the motion of the drive coil is given by:

$$e_m = U \frac{dx}{dt} \quad (14)$$

This voltage is the output of the closed loop system. As is well known, the output of a degenerative closed loop system is made as nearly a replica of the input as the gain and frequency characteristics permit.

The input of this closed loop system is a square wave which is amplified and applied through the FM reed driving coil. As previously stated, if the magnetron is to have triangular modulation, the driven reed—and hence the feedback coil wound upon it—must move with a uniform velocity in one direction, suddenly reverse, and move in a uniform velocity in the other direction. The voltage induced in this feedback coil is proportional to the velocity $V(s)$ of the reed which is given by:

$$V(s) = sX(s) \quad (15)$$

or, from Equation 9 by:

$$V(s) = \frac{U}{RK} \frac{sE_0(s)}{\frac{M}{K}s^2 + \left(\frac{B}{K} + \frac{U^2}{RK}\right)s + 1} \quad (16)$$

The voltage output from the feedback coil will thus be constant while motion of the reed is in one direction, changes polarity when the coil reverses direction and remains constant at the new polarity until the cycle reoccurs. If the desired triangular wave form of motion of the reed is obtained, the voltage output from the feedback coil will be a square wave. This square wave, because of the connections, is 180° out of phase with the square wave input to the amplifier and is subtracted therefrom.

The necessary triangular voltage wave form in the drive amplifier is essentially the error voltage in the closed loop and first appears at the point where the output wave form is subtracted from the input wave form. If, for any reason, the motion of the drive coil is not exactly a triangular wave containing the notches necessary to compensate for the reed inertia, the voltage derived across the feedback coil is not a perfect square wave, but has an error component superimposed thereupon. After subtraction of the square wave component of the feedback voltage from the input square wave, the resultant error voltage remaining is fed to the amplifier input and re-amplified in phase opposition so as to tend to cancel out the error originally generated by irregularities in the drive coil motion.

Because of the closed loop feedback system of the present invention, therefore, the peculiar notched triangular drive wave form necessary for correcting for the acceleration of the coil at the turn around point is obtained automatically and substantially perfect triangular frequency modulation is attained at all times.

The effect of appreciable changes in parameters of the prior art systems previously referred to are automatically reduced in the circuit of the subject invention by a factor of 5 to 15 because of the 15 to 24 db inverse feedback at the fundamental drive frequency.

With the subject invention the incompatibility between high reed sensitivity and good band width which is inherent in a single coil or prior art system is eliminated. A high sensitivity is obtained from the low stiffness (Equation 9) corresponding to a low reed mechanical resonance (approximately 300 cycles per second) and yet the closed loop available band width extends up to this mechanical resonance, as will be shown subsequently.

Fig. 1 illustrates a novel frequency modulated magnetron, generally indicated by reference numeral 10, which utilizes a vibrating read upon which a driving coil and a feedback coil are mounted.

Magnetron 10 is similar in many respects to the tunable magnetrons shown by Becker in United States Patent No. 2,566,478, dated September 4, 1951; since the differences are important, a description of the magnetron of the subject invention is in order.

Magnetron 10 comprises an anode structure 11, a cathode structure 12 (only partially shown), magnetic means including pole pieces 13 and 14 for establishing a magnetic field in a direction perpendicular to the path of the electron flow between said cathode and anode structures, and a tuning means 15.

As shown in Fig. 1, anode structure 11 includes a tubular cylindrical body 16 made of any material of high electrical conductivity, such as copper or silver, and having a plurality of radially extending anode vanes 17, as is well known in the magnetron art. Anode structure 11 is closed at the ends, for example, by end plates 18 and 19 hermetically sealed at the junction between said plates and body 16, as shown at 20.

The cathode structure 12 is coaxially arranged with respect to the anode structure and comprises a cathode sleeve 21 having a reduced portion 22 adjacent anode vanes 17 which is provided with an electron-emissive coating 23. A cathode heating filament 24 passes through the recess in cathode body 16 in the usual manner. The cathode may be supported and insulated from the anode structure in the manner shown in the aforesaid patent to Becker.

One of the pole pieces 13 is hermetically sealed, as at 25, into the end plate 18. The other pole piece 14 contains a centrally located bore 26 which allows for the entry of cathode assembly 12 into the magnetron; pole pieces 14 may be hermetically sealed, as at 27, into the end plate 19.

Pole pieces 13 and 14 are adapted to be fixed to the opposite ends of a magnet, such as a horse-shoe magnet (not shown), for producing an appropriate magnetic field in a direction normal to the path of the electrons flowing from cathode to anode.

A coupling loop 28 positioned within one of the spaces between two adjacent anode vanes 17 serves to couple energy out of the magnetron and is brought out through outlet pipe 30 which threadedly engages cylindrical body 16 of anode structure 11.

The anode vanes 17 are each provided with a slot 31 for receiving a pair of concentric conducting straps 32 and 33 which contact alternate anode vanes. As is well known in the magnetron art, the aforesaid straps present a capacitance therebetween which partially determines the natural resonant frequency of the magnetron. If a conducting member is moved with respect to anode vanes 17, that is, with respect to straps 32 and 33, the distributed capacitance may be altered so that the magnetron may be varied in frequency. The aforesaid conducting member takes the form of an annular diaphragm 34, which is the lower flanged portion of a hollow cylindrical core or reed 35. Reed 35 is supported from an upper flanged portion 36 which is secured, at its periphery, to a supporting ledge 37 of anode body 16.

A driving coil 40 of insulated wire is wound upon reed 35 and firmly attached thereto. One end 40' of said coil is electrically connected to the reed while the other end passes through an opening 38 in upper flange 36 and out of the magnetron through a glass seal 41 fused into an outlet pipe 42. The outlet pipe, in turn, is hermetically sealed into end plate 18. The driving coil 40 is energized through input leads 43 and 44 which are connected, respectively, to the anode block and the end of coil 40 extending externally of glass seal 41.

A feedback coil 50 of insulated wire is also wound upon reed 35, either directly over driving coil 40, or in close proximity therewith, as shown in Fig. 1. The ends of feedback coil 50 are led out of the magnetron through an aperture 51 in upper flange 36 and glass seal 52 fused into outlet pipe 53 which is hermetically sealed into end plate 18. Output leads 54 and 55 are connected to the ends of coil 50 extending beyond glass seal 52.

The reed 35 and the driving coil 40 carried thereon are disposed relative to the pole pieces 13 and 14 so that the driving coil 40 is within the leakage field existing between said pole pieces. When an external modulating voltage is applied across terminals 43 and 44, the electromagnetic field set up by the current flowing in driving coil 40 and the leakage magnetic field of the magnetron interact to produce motion of reed 35 and its accompanying diaphragm 34 with respect to the anode vanes 17. In this manner, the distributed capacitance of the magnetron is varied and frequency modulation obtained.

As the reed 35 vibrates to and fro in response to the driving coil input at terminals 43 and 44, feedback coil 50 is also moved in the magnetic field existing between the pole pieces 13 and 14. By virtue of the well-known generator action produced by a coil moving in a magnetic field, a voltage is generated across the terminals of feedback coil 50 and appears across leads 54 and 55.

Figure 2:
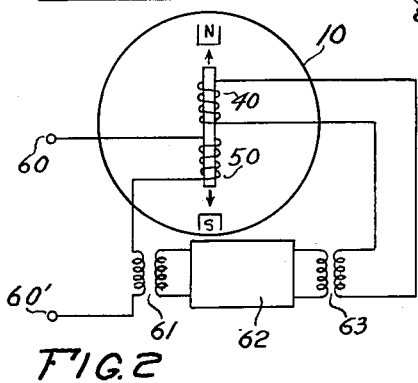
Fig. 2 is a simplified schematic of the magnetron feedback circuit of the subject invention in which the feedback coil is connected in a manner to affect the input signal to the driving coil, hereinafter referred to as a "closed loop" circuit.

Referring to Fig. 2, a square wave applied to input terminals 60, 60' is coupled by way of a modulation input transformer 61 to the input of a modulation amplifier 62 along with the output from the feedback coil 50 of the magnetron 10. The output from amplifier 62 is coupled through output transformer 63 to the driving coil 40 shown in Fig. 1. The reed 35 about which coils 40 and 50 are securely wound is adapted to move to and fro between the magnetic pole pieces 13 and 14 as shown by the arrows.

Figure 3:
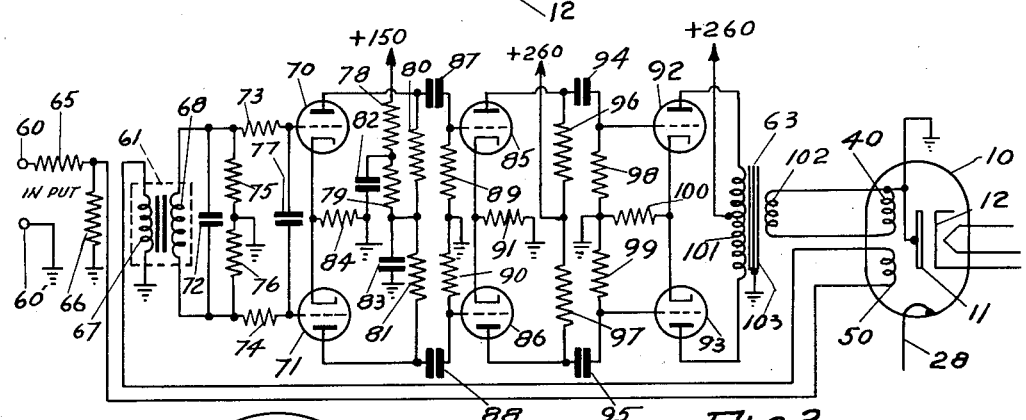
Fig. 3 is a complete schematic diagram of the magnetron feedback circuit of Fig. 2 showing the modulator in detail.

In Fig. 3, a complete circuit of the modulator shown in Fig. 2 is illustrated. The modulator is a three stage push-pull amplifier using conventional resistance interstage couplings and transformer input and output coupling.

A frequency modulated signal is fed into the primary 67 of modulator input transformer 61 through a voltage divider consisting of resistors 65 and 66 together with the output voltage from feedback coil 50 on the reed of magnetron 10. The output derived across secondary winding 68 of transformer 61 is applied to the input of a first push-pull amplifier stage comprising vacuum tubes 70 and 71. The capacitor 72 connected directly across secondary winding 68 of the grid circuit of the first stage cooperates with the secondary circuit impedance to form a low pass filter having a 6 db per octave drop in frequency response above approximately 300 C. P. S. A second filter consisting of resistors 73 to 76 and capacitors 72 and 77 has a 6 db per octave drop in frequency response above approximately 550 C. P. S. These two filters, acting in concert, have a frequency response which drops rapidly above approximately 350 C. P. S. Plate voltage for tubes 70 and 71 is derived from the source of 150 volts through plate decoupling resistors 78 and 79 and plate resistors 80 and 81, respectively. Capacitors 82 and 83 are decoupling capacitors for tubes 70 and 71, respectively, while resistor 84 is the usual cathode bias resistor.

The push-pull output of the first stage of the modulator is fed into the push-pull input circuit of a second amplifier stage comprising electron tubes 85 and 86 through input coupling capacitors 87 and 88. Resistors 89 and 90 are the grid resistors, resistors 96 and 97 the plate resistors, and resistor 91 the cathode bias resistor, for tubes 85 and 86.

The output from the second stage of the modulator is coupled by resistance-capacitance means to the third stage of the modulator comprising electron tubes 92 and 93. Capacitors 94 and 95 are the inter-stage coupling capacitors, and resistors 98 and 99 the grid resistors, for tubes 92 and 93, respectively. Resistor 100 is the cathode bias resistor for the third stage. The output of the third stage is applied to the primary 101 of modulator output transformer 63 whose core 103 is grounded. The secondary 102 of transformer 63 is connected directly to the driving coil 40 of magnetron 10. The anode 11 and one side of coil 40 are connected to ground. The feedback coil 50 of magnetron 10 is connected in series with the primary 67 of modulator input transformer 61.

Figure 4:
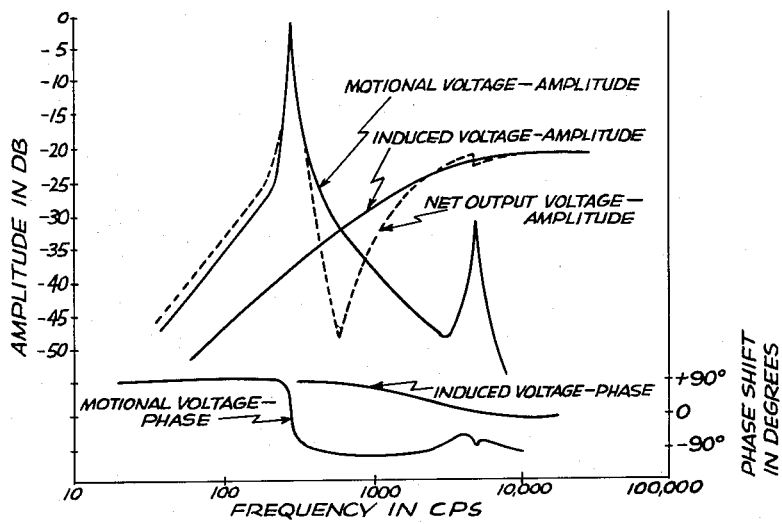
Fig. 4 is a plot of the magnetron open loop FM feedback voltage as compared with the driving coil voltage, where the expression "open loop" refers to a network in which the feedback coil is not connected in any manner to affect the input circuit to the driving coil.

In Fig. 4, the plot of the amplitude and phase of the open loop feedback voltage with respect to the driving voltage is shown. An open loop as herein described, refers to a circuit comprising the driving coil 40 of Figs. 1 to 3 energized by the source of input voltage and a feedback coil 50 in energy coupling relationship with said driving coil and having open-circuited output terminals across which an output voltage is derived. A "closed loop," on the other hand, includes, in addition to the elements of the open loop, means for supplying the output voltage derived across the aforesaid output terminals of the feedback coils 50 to the input circuit to the driving coil 40.

Since the driving coil and feedback coil are wound close together on the magnetron reed, and since the reed moves in a fixed magnetic field, two voltages will, in effect, be developed in the feedback coil; one of said voltages will be developed from the driving voltage because of reed motion and the other voltage generated because of transformer action. The feedback coil output voltage due to transformer action is low at low frequencies, rising slowly with frequency and is 90° leading in phase relative to the driving voltage up to about 3000 cycles per second. The output voltage due to motion of the reed (motional voltage) is higher than the transformer voltage at low frequencies, rising sharply to a peak at the mechanical resonance of the reed (300 C. P. S.), and then dropping rapidly above resonance. The phase angle of the motional voltage is 90° leading with respect to the driving voltage at low frequencies, dropping rapidly to zero at resonance and rising rapidly to 90° lagging in phase above resonance. The feedback voltage applied to the input of the modulator will, therefore, be equal to the sum of the motional and transformer action voltages below resonance, since the two voltages are in phase. Immediately above resonance, the feedback voltage will be equal to the difference between these two voltages, since they are 180° out of phase. At still higher frequencies the phase of the transformer action voltage drops to zero, at which point the motional and transformer voltages are displaced in phase by approximately 90°, and so forth.

From the dotted curve of Fig. 4, it can be seen that the total feedback voltage will rise from low frequencies up to resonance, drop rapidly above resonance to a null point lying between 500 and 600 cycles—where the transformer and motional voltages are equal and cancel out— and then rise again above resonance. At frequencies below resonance, the feedback voltages consist mainly of motional voltage; above the null point transformer action voltage predominates.

Figure 5:
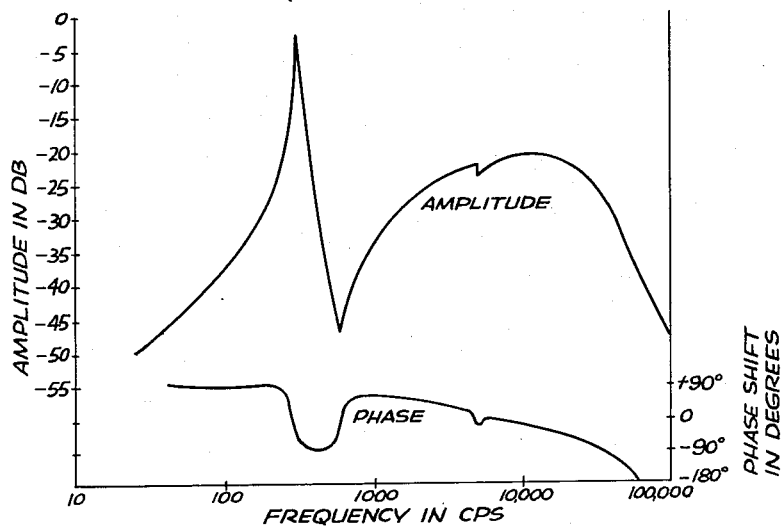
Fig. 5 is an uncompensated open loop transfer function of the reed used in the magnetron shown in Fig. 1.

In Fig. 5, the uncompensated open loop transfer function of the drive coil to pick-up coil is shown for a typical vibrating reed magnetron. The amplitude frequency response is very similar to that shown in the dotted curve of Fig. 4. The phase of the feedback voltage relative to the driving voltages is also shown in Fig. 5. It will be noted that the deep notch appearing at about 550 cycles per second and the rising gain with frequency thereafter are not predicted from Equation 15. These variations are caused by the mutual inductance between driving and feedback coil which was not taken into consideration in the preceding mathematical development. This rising gain with frequency beyond the null point prevents closing the loop with more than three to six db gain at the drive frequency of 100 C. P. S., in the absence of compensation.

Figure 6:
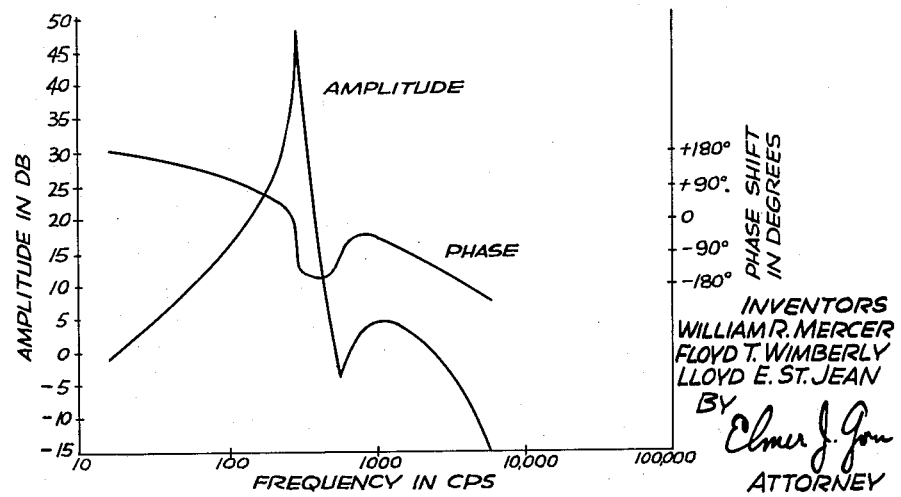
Fig. 6 is a compensated open loop characteristic of the modulator circuit shown in Fig. 3.

In Fig. 6, the open loop characteristic of the modulator circuit of Figs. 2 and 3 after compensation is shown. The dual filter mentioned in connection with the description of Fig. 3 substantially reduces the high frequency gain to allow the loop to be stably closed with ample gain (approximately twenty db) at the fundamental drive frequency.

Figure 7:
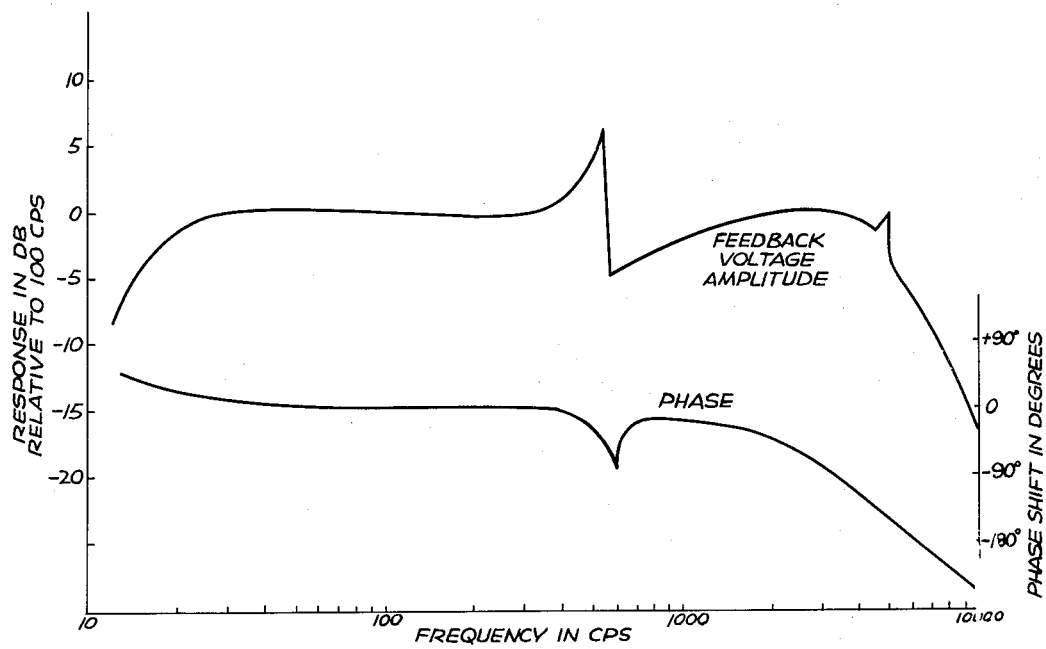
Fig. 7 is a closed loop voltage and phase response characteristic of the closed loop shown in Figs. 2 and 3.

The closed loop voltage and phase response characteristic for the feedback coil as compared with the response at 100 cycles per second is shown in Fig. 7. The reed velocity response will correspond to Fig. 7 for that portion of the frequency range where the feedback coil voltage results largely from reed motion, not mutual inductance. The system is evidently a constant velocity system from approximately 60 cycles per second to 300 cycles per second.

Figure 8:
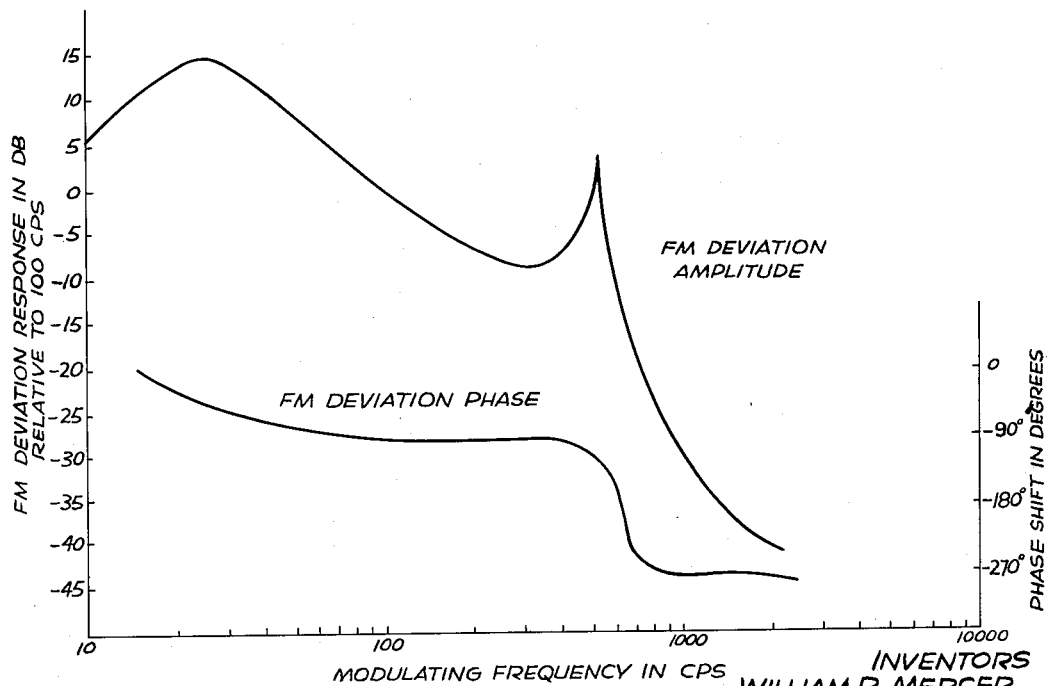
Fig. 8 is a plot of the frequency modulated deviation response of the closed loop modulator system.

In Fig. 8 the variations of the total frequency modulation deviation with the modulating reed is shown. As previously mentioned, changes in the modulating frequency $f_m$ owing to temperature changes or other changes in the constants of the oscillator supplying the input circuit to the modulator will cause an undesirable variation in calibration of the altimeter in the absence of a closed loop. In order for altitude to vary directly as the difference frequency $f_d$, the product $f_m$ ($F_2-F_1$) must remain constant. Since the FM deviation ($F_2-F_1$) is given by:

$$F_2-F_1=\frac{k}{f_m}$$

the FM deviation response should vary inversely with the modulation rate. As clearly indicated in Fig. 8, this relationship holds over the working range of from 30 to 300 cycles per second.

Because of the approximate twenty db of inverse feedback at the fundamental drive frequency, the effect of changes in parameters of the closed loop are automatically reduced considerably.

Although a closed loop resonance appears at approximately 550 cycles per second, as shown in Fig. 8, a comparison of Fig. 8 and Fig. 4 indicates that the electrical resonance has approximately thirty db less response, referred to 100 C. P. S. sensitivity, than the mechanical resonance of 300 C. P. S., so that the 300 C. P. S. microphonic problem previously referred to is of no practical consequence.

In regard to the incompatibility between high reed sensitivity and adequate band width necessary for a good triangular wave form, it is apparent from Fig. 8 that the closed loop available band width extends up to the low mechanical resonant frequency of 300 C. P. S.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A frequency modulation circuit comprising an electron discharge device including a cathode, an anode, a means for producing a magnetic field and a reed positioned in said magnetic field, said reed being supported within said device and movable with respect to said anode for varying the frequency of operation of said device, a first coil and a second coil each carried by said reed, an amplifier receptive of a modulating input voltage and having input and output circuits, said first coil being connected to said amplifier output circuit for producing an electromagnetic field in said first coil, said electromagnetic field interacting with said magnetic field to impart motion to said reed, said second coil being responsive to the motion of said reed for deriving a feedback voltage, said amplifier input circuit being energized by said feedback voltage and said modulating voltage.

2. A closed loop frequency modulation circuit comprising an electron discharge device including a cathode, an anode, a means for producing a magnetic field normal to the electron flow between said cathode and said anode, and a reed having a relatively low mechanical resonant frequency and consequently a high sensitivity positioned in said magnetic field, said reed being supported within said device and movable with respect to said anode for varying the frequency of operation of said device, a first coil having a small time constant and a second coil each carried by said reed, an amplifier receptive of a square wave modulating input voltage and having input and output circuits, said first coil being connected to said amplifier output circuit for producing an electromagnetic field in said first coil, said electromagnetic field interacting with said magnetic field to cause a displacement of said reed which varies with respect to time in a substantially triangular manner, said second coil being responsive to the displacement of said reed for deriving a feedback voltage which in the absence of variations in said displacement from a desired value is substantially a square wave, said amplifier input circuit being energized by said feedback voltage and said modulating voltage for deriving a compensating voltage which tends to cancel out said variations, said closed loop having a band width extending up to said mechanical resonant frequency.

3. A closed loop frequency modulation circuit for deriving a desirable stable frequency modulation characteristic comprising an electron discharge device for generating radiant energy including a cathode, an anode containing a plurality of conductive straps, a means for producing a magnetic field and a mechanical tuning means positioned in said magnetic field, said tuning means being supported within said device and movable with respect to said anode straps for varying the frequency of operation of said device, a first coil and a second coil each carried by said tuning means, an amplifier receptive of a modulating input voltage and having input and output circuits, said first coil being connected to said amplifier output circuit for producing an electromagnetic field in said first coil, said electromagnetic field interacting with said magnetic field to impart motion to said tuning means, said second coil being responsive to the motion of said tuning means for deriving a feedback voltage, circuit means responsive to said feedback voltage and said modulating voltage for deriving an error voltage, said amplifier input circuit being energized by said error voltage for compensating for variations in said desired frequency modulation characteristic.

4. A frequency modulation circuit for deriving a stable frequency modulation characteristic comprising a generator of radiant energy including a cathode and an anode defining therebetween an energy interaction space, means for producing a magnetic field transverse to said interaction space, and a mechanical tuning means disposed within said magnetic field and whose instantaneous position determines the frequency of operation of said generator, driving means for imparting motion to said tuning means as a function of an applied modulating input voltage, said generator including therein feedback means disposed within said magnetic field and in proximity with said driving means, said feedback means being responsive to the motion of said tuning means for deriving a degenerative feedback voltage, said feedback voltage and said input voltage combining to produce an error voltage, said driving means being energized by said error voltage for compensating for variations in said frequency modulation characteristic.

5. A closed loop frequency modulation circuit comprising an electron discharge device including a cathode, an anode, a means for producing a magnetic field normal to the electron flow between said cathode and said anode, and a reed positioned in said magnetic field, said reed being supported within said device and movable with respect to said anode for varying the frequency of operation of said device, a first coil and a second coil each carried by said reed, an amplifier receptive of a modulating input voltage and having input and output circuits, said first coil being connected to said amplifier output circuit for producing an electromagnetic field in said first coil, said electromagnetic field interacting with said magnetic field to cause a displacement of said reed which varies with respect to time in a predetermined manner, said second coil being responsive to the displacement of said reed for deriving a feedback voltage, said amplifier input circuit being energized by said feedback voltage and said modulating voltage for deriving a compensating voltage which tends to cancel out variations in displacement of said reed from a predetermined desired value.

6. A closed loop frequency modulation circuit for deriving a desirable stable frequency modulation characteristic comprising an electron discharge device for generating radiant energy including means for producing a magnetic field and a mechanical tuning means positioned in said magnetic field, said tuning means being supported within said device and movable therein for varying the frequency of operation of said device, a first coil and a second coil each carried by said tuning means, an amplifier receptive of a modulating input voltage and having input and output circuits, said first coil being connected to said amplifier output circuit for producing an electromagnetic field in said first coil, said electromagnetic field interacting with said magnetic field to impart motion to said tuning means, said second coil being responsive to the motion of said tuning means for deriving a feedback voltage, circuit means responsive to said feedback voltage and said modulating voltage for deriving a compensating voltage, said amplifier input circuit being energized by said compensating voltage for compensating for variations from said desired frequency modulation characteristic.

7. A closed loop frequency modulation circuit for deriving a desirable stable frequency modulation characteristic comprising an electron discharge device for generating radiant energy including a cathode, an anode, means for producing a magnetic field and a mechanical tuning means positioned in said magnetic field, said tuning means being supported within said device and movable with respect to said anode for varying the frequency of operation of said device, a first coil and a second coil each carried by said tuning means, an amplifier receptive of a modulating input voltage and having input and output circuits, said first coil being connected to said amplifier output circuit for producing an electromagnetic field in said first coil, said electromagnetic field interacting with said magnetic field to impart motion to said tuning means, said second coil being responsive to the motion of said tuning means for deriving a feedback voltage, circuit means responsive to said feedback voltage and said modulating voltage for deriving a compensating voltage, said amplifier input circuit being energized by said compensating voltage for compensating for variations from said desired frequency modulation characteristic.

References Cited in the file of this patent
UNITED STATES PATENTS

| | | |
|---|---|---|
| 2,114,036 | Smith et al. | Apr. 12, 1938 |
| 2,301,907 | Pieracci | Nov. 10, 1942 |
| 2,566,479 | Becker | Sept. 4, 1951 |
| 2,589,885 | Sonkin | Mar. 18, 1952 |